United States Patent
Michel et al.

(10) Patent No.: US 10,591,027 B2
(45) Date of Patent: Mar. 17, 2020

(54) HYDRAULIC TRACTION MECHANISM TENSIONER INCLUDING A PRESSURE REGULATOR

(71) Applicant: Schaeffler Technologies AG & Co. KG, Herzogenaurach (DE)

(72) Inventors: Tobias Michel, Herzogenaurach (DE); Markus Fischer, Hessdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 132 days.

(21) Appl. No.: 15/563,057

(22) PCT Filed: Jan. 27, 2016

(86) PCT No.: PCT/DE2016/200046
§ 371 (c)(1),
(2) Date: Sep. 29, 2017

(87) PCT Pub. No.: WO2016/155712
PCT Pub. Date: Oct. 6, 2016

(65) Prior Publication Data
US 2018/0066732 A1 Mar. 8, 2018

(30) Foreign Application Priority Data
Mar. 31, 2015 (DE) .................. 10 2015 205 777

(51) Int. Cl.
*F16H 7/08* (2006.01)
(52) U.S. Cl.
CPC ....... *F16H 7/08* (2013.01); *F16H 2007/0806* (2013.01); *F16H 2007/0812* (2013.01);
(Continued)

(58) Field of Classification Search
CPC ........ F16H 7/08; F16H 7/0848; F16H 7/0829; F16H 2007/0802; F16H 2007/0812;
(Continued)

(56) References Cited

U.S. PATENT DOCUMENTS

| 6,626,164 B2 | 9/2003 | Hitomi et al. |
| 6,810,907 B2 | 11/2004 | Hashimoto et al. |

(Continued)

FOREIGN PATENT DOCUMENTS

| DE | 3824555 C1 * | 7/1989 | ........... F16H 7/0848 |
| DE | 60200696 | 12/2004 | |

(Continued)

OTHER PUBLICATIONS

International Search Report of PCT/DE2016/200046 dated Apr. 4, 2016, 2 pages.

*Primary Examiner* — Michael R Mansen
*Assistant Examiner* — Raveen J Dias
(74) *Attorney, Agent, or Firm* — Davidson, Davidson & Kappel, LLC

(57) ABSTRACT

A hydraulic traction mechanism tensioner for a traction mechanism drive of a motor vehicle, having a housing, and a valve which has an actuating element and is inserted in a fluid supply channel of the housing, wherein the valve hydraulically connects a first channel section of the fluid supply channel which opens into the pressure chamber to a hydraulic supply in a first position of the actuating element, and disconnects the first channel section from the hydraulic supply in a second position of the actuating element, wherein the valve is configured as a pressure regulating valve, wherein the actuating element can be moved beyond the second position into at least one further, third position, with the result that a volume of the first channel section is increased in comparison with the second position.

11 Claims, 2 Drawing Sheets

(52) U.S. Cl.
CPC ............. *F16H 2007/0814* (2013.01); *F16H 2007/0859* (2013.01); *F16H 2007/0891* (2013.01)

(58) Field of Classification Search
CPC ..... F16H 2007/1814; F16H 2007/0817; F16H 2007/0859; F16H 2007/0891
USPC ........................................................ 474/110
See application file for complete search history.

(56) References Cited

U.S. PATENT DOCUMENTS

| | | | | |
|---|---|---|---|---|
| 2003/0070717 A1* | 4/2003 | Hashimoto | ........... | F16H 7/0848 137/825 |
| 2008/0119309 A1 | 5/2008 | Kern et al. | | |
| 2009/0170647 A1* | 7/2009 | Mishima | ............... | F16H 7/0848 474/110 |
| 2009/0197721 A1* | 8/2009 | Emizu | .................. | F16H 7/0836 474/110 |
| 2009/0197722 A1* | 8/2009 | Emizu | .................. | F16H 7/0836 474/110 |
| 2010/0093473 A1* | 4/2010 | Bulloch | ................ | F16H 7/0836 474/104 |
| 2011/0237370 A1 | 9/2011 | Hartmann | | |
| 2011/0256970 A1* | 10/2011 | Nakano | ................. | F16H 7/0836 474/110 |
| 2012/0202629 A1* | 8/2012 | O'Shea | ................. | F16H 7/0836 474/110 |
| 2012/0252615 A1* | 10/2012 | Konuma | ............... | F16H 7/0848 474/110 |
| 2014/0100068 A1* | 4/2014 | Kurematsu | ............... | F16H 7/08 474/110 |
| 2015/0024886 A1* | 1/2015 | Chekansky | ........... | F16H 7/0836 474/101 |
| 2015/0024887 A1 | 1/2015 | Oh et al. | | |
| 2015/0240918 A1* | 8/2015 | Emizu | ..................... | F01L 1/024 474/110 |
| 2018/0180191 A1* | 6/2018 | Shinoyama | ............... | F16H 7/08 |
| 2018/0363739 A1* | 12/2018 | Hartmann | ................. | F16H 7/08 |

FOREIGN PATENT DOCUMENTS

| | | |
|---|---|---|
| DE | 60200396 | 5/2005 |
| DE | 102004012394 | 9/2005 |
| DE | 102009057640 A1 | 6/2011 |
| DE | 102010034485 | 2/2012 |
| EP | 1302698 | 4/2003 |
| EP | 1925851 | 5/2008 |
| EP | 2103853 A2 | 9/2009 |
| JP | 2008211945 | 9/2008 |
| JP | 2010206869 | 9/2010 |
| JP | 2014077465 A | 5/2014 |
| WO | WO2013047283 A1 | 4/2013 |

* cited by examiner

HYDRAULIC TRACTION MECHANISM TENSIONER INCLUDING A PRESSURE REGULATOR

The present invention relates to a hydraulic traction mechanism tensioner for a traction mechanism drive, such as a belt or chain drive, of a motor vehicle, such as a passenger car, a truck, a bus or an agricultural utility vehicle, including a housing, a tensioning piston, which is displaceably mounted within the housing in the axial direction and encloses a hydraulic chamber together with the housing, and a valve, which is inserted into a fluid supply channel of the housing and includes an actuating element, the valve hydraulically connecting a first channel section of the fluid supply channel, which opens into the pressure chamber, to a hydraulic supply in a first position of the actuating element and disconnecting this first channel section from the hydraulic supply in a second position of the actuating element, the valve being designed as a pressure control valve/pressure regulator/pressure controller, and the actuating element being movable beyond the second position into at least one additional third position, so that a volume of the first channel section is increased in comparison to the second position. During operation, the tensioning piston applies a pretensioning force to a traction mechanism of the traction mechanism drive, the pretensioning force being formed from a spring force of a tensioning piston spring and a hydraulic pressure component, which results from the pressure in the pressure chamber acting upon an axial tensioning piston surface.

BACKGROUND

Hydraulic traction mechanism tensioners having a generic design are already known from the prior art. One example of a design is disclosed in DE 10 2004 012 394 A1, a hydraulic tensioner for a traction means, in particular for a chain or a belt, being prepared and having a damping action which is varied via the lift. In this connection, the damping action increases as the lift also increases.

Another hydraulic tensioning device is the subject matter of DE 602 00 696 T2. A tensioner housing, including a tensioning piston, is shown, which together enclose a high pressure chamber. The high pressure chamber is connected to a hydraulic medium supply. In addition, the hydraulic chamber is connected to a relief valve to avoid an excessive pressure in the high pressure chamber. The relief valve includes a valve element receiving bore, which is connected to an oil supply opening, as well as a valve element which is situated to be displaceable forwardly and backwardly in the valve element receiving bore. The relief valve furthermore includes a spring, which pretensions the valve element in the direction of the oil supply opening, and an oil relief opening in a surrounding wall of the valve element receiving opening. The oil relief opening is situated at a point where it is closed when the valve element moves backward due to a rapid increase in the oil pressure at the oil supply opening, whereby a quantity of oil is trapped in the valve element receiving opening to damp the movement of the valve element.

US 2015/0 024 887 A1 shows a tensioning device for a chain drive, including a housing, a tensioning piston and a high pressure chamber enclosed by the housing and tensioning piston. The high pressure chamber is connected to a supply port via a check valve and an inlet line. A spring-loaded pressure regulating piston, which closes the inlet opening if a pressure rises in the inlet line, is situated in the inlet line.

Another tensioning device is the subject matter of DE 10 2010 034 485 A1. The illustrated tensioning device includes a housing and a tensioning piston, which together enclose a high pressure chamber supplied with hydraulic medium via an inlet line. A check valve unit essentially prevents the hydraulic medium present in the high pressure chamber from flowing out in the direction of the inlet but permits a limited outflow against the inlet direction via a leakage gap between the housing and the check valve unit.

In traction mechanism tensioners of this type, however, it has been shown in certain operating states that a relatively great friction may be frequently generated by a relatively high tensioning force of the particular tensioning piston on the traction mechanism. Moreover, the activation of a traction mechanism tensioner of this type is often relatively complicated for the purpose of setting the corresponding damping force of the tensioner or reducing the contact force.

SUMMARY OF THE INVENTION

It is an object of the present invention to eliminate the disadvantages known from the prior art and, in particular, to provide a tensioner which is to apply much less friction to the traction mechanism drive/the traction mechanism during operation, so that the efficiency of the motor vehicle is improved.

The present invention provides that the first channel section is permanently separated from the hydraulic supply in a displacement range of the actuating element between the second position and the third position.

By introducing a pressure control valve in this manner, it is possible to set the volume of the hydraulic medium stored in the first channel section, whereby pressure peaks are damped and an additional buffer storage unit is implemented. As a result, a preferably uniform contact of the piston with a preferably low fluctuation of the tensioning force is, in turn, generated. The friction is consequently reliably reduced in the intended operating states.

Other advantageous specific embodiments are explained in greater detail below.

It is furthermore advantageous if the actuating element is designed in a piston-like manner, i.e. as a regulating piston, and is preferably displaceably accommodated axially within a receiving chamber introduced (directly) into the housing. The structure as well as the accommodation of the pressure control valve, including the actuating element, are kept particularly simple thereby.

In this connection, it is also advantageous if the receiving chamber is hydraulically connected to the first channel section on an axial end or if it opens into this first channel section. The geometry of the fluid supply channel is also further simplified thereby.

If the actuating element is elastically pretensioned in such a way that it is/becomes adjusted as a function of a hydraulic pressure active in the first channel section, the actuating element is automatically adjusted to adapt the volume of the first channel section.

If the actuating element is spring-elastically pretensioned relative to a cover section fixedly mounted on the housing (preferably spatially limiting the receiving chamber in the direction of the surroundings), it is particularly effectively held between the particular positions as a function of an elastic pretensioning force, which is preferably generated via a pressure spring.

In this connection, it is particularly advantageous if an ambient (air) pressure is applied to the actuating element via its (axial) side/outside facing away from the first channel section, i.e. via the side which is not in contact with the hydraulic medium of the first channel section. The structure of the pressure control valve is further simplified. A hydraulic pressure of the hydraulic medium set in the first channel section is thus present at the actuating element, an axial force component of this hydraulic pressure being oriented opposite an axial component of the ambient pressure, together with the spring-elastic pretension/pretensioning force of the pressure spring. A setting of the actuating element is particularly easily reproducible thereby.

In this connection, it is also advantageous if a through-hole is introduced directly into the cover section, which implements a passage/connection from the outside of the actuating element to the surroundings/ambient air. The structure is further simplified thereby.

The pressure control valve is advantageously situated in its receiving chamber between the first channel section and a second channel section.

If the actuating element then hydraulically connects the first channel section to this second channel section (permanently) connected to the hydraulic supply in the first position and hydraulically disconnects the second channel section from the first channel section in the second position, the hydraulic supply is particularly effectively active.

It is also advantageous if the actuating element is adjusted in the first position at a first hydraulic pressure active in the first channel section and is adjusted in the second position at a second hydraulic pressure active in the first channel section, the second pressure being higher than the first pressure. A pressure control is particularly easily implemented thereby.

If the actuating element has a radial outer wall which is provided with at least one radial hole, preferably designed as a through-hole (i.e. having at least one hole/through-hole extending in the radial direction of the actuating element) in such a way that, in the first position, a radial inner chamber of the actuating element, hydraulically connected to the first channel section, is hydraulically connected to the hydraulic supply (via the second channel section) with the aid of this at least one radial hole, the connection to the hydraulic supply is designed to be particularly direct.

It is also advantageous if a check valve is provided in the first channel section, between the pressure chamber and the pressure control valve. The supply of the pressure chamber is then designed to be even more effective.

In this connection, if a leakage gap/leak gap is formed between a valve seat body of the check valve and the housing, whereby the pressure chamber is permanently hydraulically connected to the first channel section (via at least one bypass channel), the hydraulic medium flowing back from the pressure chamber may be stored directly in the first channel section and be reused, if necessary, for a subsequent increase of the pressure in the pressure chamber. A hydraulic medium supply of the pressure chamber is also provided with a more sparing design thereby.

In other words, a pressure regulator (pressure control valve) of a hydraulic tensioner/traction mechanism tensioner for a traction mechanism drive, preferably a chain drive, is implemented according to the present invention. The concept according to the present invention, includes a piston (actuating element/regulating piston), which is integrated into a feed channel (fluid supply channel), the piston increasing the volume of the first channel section in the direction of the tensioner and being able to disconnect the supply connection to the hydraulic supply.

BRIEF DESCRIPTION OF THE DRAWINGS

The present invention is now explained in greater detail below on the basis of figures.

DETAILED DESCRIPTION

Figure 1:
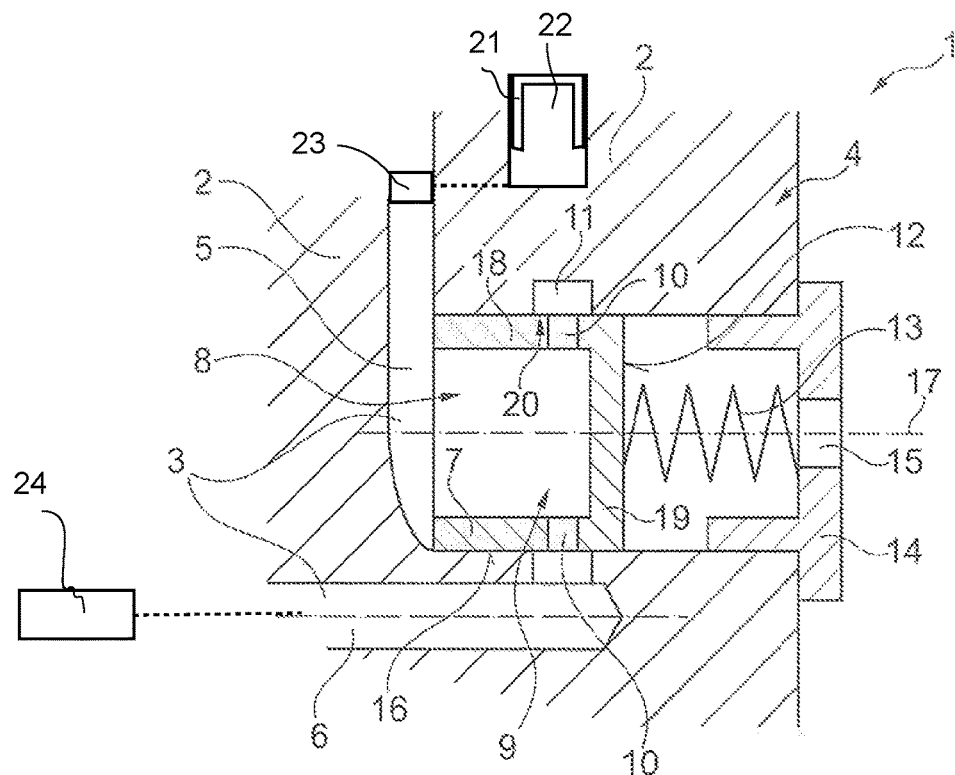
FIG. 1 shows a sectional representation of a housing of a traction mechanism tensioner according to the present invention according to one advantageous exemplary embodiment, the traction mechanism tensioner being cut in the area of the pressure control valve, as well as, in particular, its connection to the first channel section and to the second channel section of the fluid supply channel being apparent, and the actuating element being in the first position, in which it hydraulically connects the first channel section to the hydraulic supply.

The figures are only of a schematic nature and are used exclusively for the sake of understanding the present invention. Identical elements are provided with identical reference numerals.

A traction mechanism tensioner 1 according to the present invention is first illustrated sectionally in FIG. 1 according to one advantageous exemplary embodiment. Traction mechanism tensioner 1 is illustrated in a sectional as well as cut manner, in particular in the area of its housing 2. Hydraulic traction mechanism tensioner 1 is designed as a traction mechanism tensioner 1 for a traction mechanism drive, i.e. for tensioning a traction mechanism of the traction mechanism drive, which is not further illustrated here for the sake of clarity. The traction mechanism drive is preferably a chain or belt drive, which is rotatably fixedly connected to an output shaft/crankshaft of an internal combustion engine, such as a gasoline engine or a diesel engine. Consequently, the traction mechanism tensioner is prepared and designed to tension a chain/belt of this belt or chain drive.

Traction mechanism tensioner 1 usually includes a tensioning piston 21, which is shown schematically in FIG. 1, and which is displaceably supported within a (receiving hole) of housing 2 in its axial direction, i.e. along its longitudinal axis and encloses a hydraulic pressure chamber 22 together with housing 2. As a function of the hydraulic medium present in this hydraulic pressure chamber 22, namely as a function of the pressure of this hydraulic medium, the tensioning piston 21 is damped in its movement in the insertion direction.

Moreover, check valve 23, which is shown schematically in FIG. 1, is inserted into housing 2. The check valve 23 is inserted in such a way, that as a function of its position, it connects the pressure chamber 22 to a fluid supply channel 5 in an open position, releasing a first opening cross section, and disconnects, i.e. completely hydraulically disconnects/separates the pressure chamber 22 from fluid supply channel 5 in a closed position. Alternatively, however, it is also implemented in other exemplary embodiments that fluid supply channel 5 is hydraulically connected even in the closed position of the check valve 23 (via a leakage gap/leak gap/bypass channel on the side of the check valve), at least through a second opening cross section, which is reduced (relative to the first opening cross section). The pressure chamber 22 is then permanently connected to fluid supply channel 5.

As is furthermore particularly apparent in FIG. 1, according to the present invention, a valve 4 designed as a pressure control valve is added to fluid supply channel 3. Consequently, valve 4 is referred to below as pressure control valve 4 (alternatively, however, also as pressure controller/pressure regulator). Pressure control valve 4 is integrated into fluid supply channel 3. Fluid supply channel 3 is essentially divided into two sections, the first section being referred to below as first channel section 5 and the second section being referred to below as second channel section 6. First channel section 5 is the section which hydraulically connects pressure control valve 4 to the check valve/the pressure chamber in the form of a connecting channel section, at least in the open position of the check valve. A hydraulic medium contained in first channel section 5 during the operation of traction mechanism tensioner 1, preferably an oil of the engine oil supply/hydraulic medium supply of the engine/internal combustion engine, is accommodated by the volume of first channel section 5.

Pressure control valve 4 is connected to this first channel section 5. Pressure control valve 4 according to the present invention is inserted into housing 2 in such a way that its actuating element 7, designed as a piston, which is therefore referred to below as regulating piston 7, is displaceable in an axial direction/in its longitudinal direction (i.e. along its longitudinal axis 17) in a receiving chamber 8 introduced into housing 2 (longitudinal axis 17 corresponds to a longitudinal axis 17 of receiving chamber 8). Regulating piston 7, which is essentially designed in the shape of a cup, forms an inner chamber 9. Inner chamber 9 is situated in the radial direction within a sleeve-like and cylindrical, radial outer wall 18 of regulating piston 7. This radial inner chamber 9 is hydraulically connected directly and permanently to first channel section 5. As is particularly apparent in FIG. 1, first channel section 5 is mounted in housing 2 in such a way that it abuts or opens into receiving chamber 8. First channel section 5 opens on the side/end face of receiving chamber 8 facing inner chamber 9 and is designed in the form of an elongated hole/blind hole. In other words, inner chamber 9 thus even forms a part of first channel section 5.

Second channel section 6 is the section of fluid supply channel 3 which hydraulically connects pressure control valve 4 to a hydraulic supply 24 in the form of a feed channel section. During the operation of traction mechanism tensioner 1, second channel section 6 is permanently hydraulically connected or joined to this hydraulic supply 24 of the engine/internal combustion engine, such as an engine oil supply.

Regulating piston 7 is adjustable in its axial direction. Regulating piston 7 is displaceable back and forth between multiple positions. In a first position, as illustrated in FIG. 1, regulating piston 7 is placed within receiving chamber 8 in such a way that multiple radial holes 10 penetrating it in the radial direction are situated flush with an annular channel 11 belonging to second channel section 6. In this first position, therefore, first channel section 5 is hydraulically connected to second channel section 6 via these radial holes 10 as well as annular channel 11. Due to its connection to a hydraulic supply, second channel section 6 has a system pressure of the hydraulic medium supply.

Figure 2:
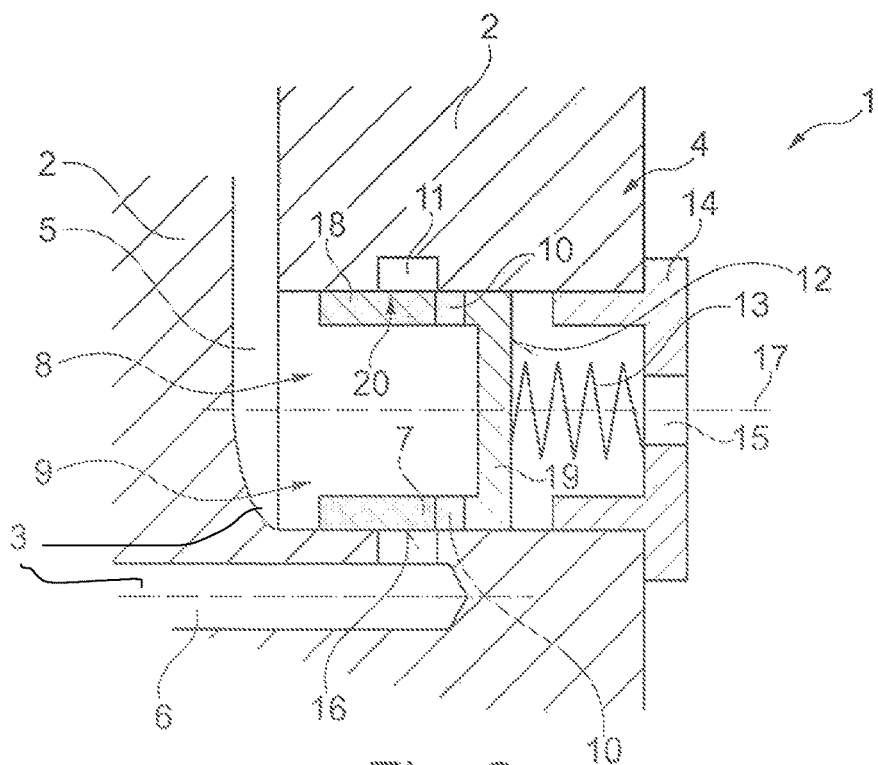
FIG. 2 shows a sectional representation according to FIG. 1, the actuating element now being illustrated in a second position, in which it hydraulically disconnects the first channel section from the hydraulic supply/the second channel section.
Figure 3:
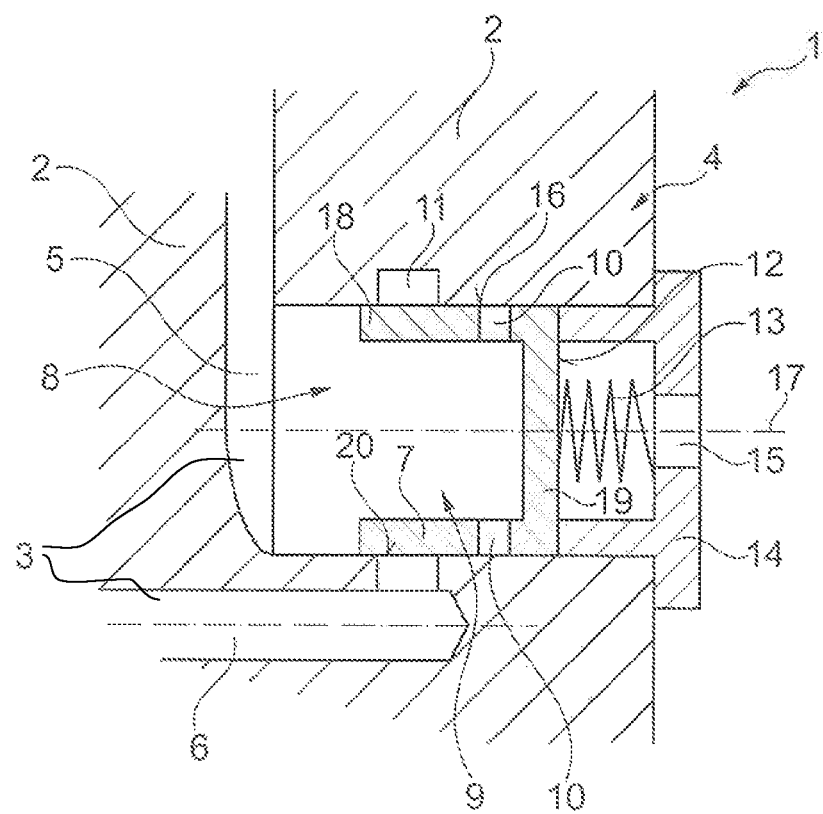
FIG. 3 shows a sectional representation according to FIG. 1, the actuating element being in a third position, in which the volume of the first channel section is at its maximum, while the first channel section is still hydraulically disconnected from the hydraulic supply/the second channel section.

As is further apparent in connection with FIGS. 2 and 3, regulating piston 7 is displaceable/adjustable as a function of a hydraulic pressure present in its inner chamber 9.

Regulating piston 7 abuts or is supported on a pressure spring 13 by its axial outside 12, which is formed in this case on an end wall 19 of cup-shaped regulating piston 7 and which is also the side of regulating piston 7 which faces away from the hydraulic medium in first channel section 5/inner chamber 9. Pressure spring 13 is designed as a helical spring and pretensions regulating piston 7 in its first position under a certain pretensioning force. Pressure spring 13 is supported by a first end on outside 12, viewed in the longitudinal direction of regulating piston 7. Pressure spring 13 is supported by a second end, opposite the first end, on a cover section 14 fixed to the housing. Cover section 14 is designed in this case as a cover element screwed into housing 2 in the area of receiving chamber 8. Cover section 14 is consequently fixedly connected to housing 2, in particular in the axial displacement direction of regulating piston 7. As a result, pressure spring 13 acts upon regulating piston 7 with the aid of its elastic pretensioning force in such a way that it forces the latter in the direction of the end face of receiving chamber 8 connected to first channel section 5.

A through-hole 15 is introduced into cover section 14, which ensures that the ambient pressure, i.e. an ambient air pressure present in the internal combustion engine, is applied to outside 12 of regulating piston 7. This pressure usually corresponds to the ambient air pressure of the motor vehicle in the area of the internal combustion engine.

Regulating piston 7 may be displaced thereby against the spring force/pretensioning force of pressure spring 13 as well as against the active axial pressure component of the ambient air pressure within first channel section 5 only upon an increase in the hydraulic pressure. In a second position of regulating piston 7 (within receiving chamber 8) illustrated in FIG. 2, a second hydraulic pressure within first channel section 5 as well as inner chamber 9 is greater than a first hydraulic pressure still active in the first position. In the second position, therefore, the pressure of the hydraulic medium in first channel section 5 is higher than a first limiting value, whereby regulating piston 7 is automatically displaced into the second position. In the illustrated second position (FIG. 2), regulating piston 7 is situated in such a way that it hydraulically cuts off/disconnects first channel section 5 from second channel section 6.

An outer circumferential side 16 of outer wall 18 abuts inside 20 of annular channel 11 to form a seal, thus preventing hydraulic medium from being introduced/flowing into first channel section 5 from second channel section 6 or from flowing back into second channel section 6 from first channel section 5. The hydraulic pressure within channel section 5 is thus higher in this second position than in the first position. As a result, a first pressure is active in the first position, which is lower than a second pressure active in the second position.

If the hydraulic pressure within inner chamber 9 is further increased in the second position of regulating piston 7, and if another, third pressure/pressure value (which is greater than the second pressure/pressure value) is applied to inner chamber 9 of regulating piston 7 or in first channel section 5, as illustrated in FIG. 3, regulating piston 7 is displaced even farther against the spring force of pressure spring 13. In FIG. 3, outside 12 of regulating piston 7 is in contact with cover section 14 in the axial direction in the third illustrated position of regulating piston 7. In a displacement range/adjustment range between the second position, i.e. the position in which second channel section 6 is just disconnected from first channel section 5, up to the third position, second channel section 6 is always/permanently disconnected from first channel section 5, i.e. in each displacement state of regulating piston 7. In this displacement path, regulating piston 7 is then used, in particular, to regulate the volume/compensate for the volume of first channel section 5. For example, if a hydraulic medium flows out of the pressure chamber back into first channel section 5, a type of safety means is present in such a way that a volume of first channel section 5 is increased so that the pressure rises to a lesser extent.

As mentioned above, it is provided in another advantageous specific embodiment that the check valve forms a leakage gap in the area of its valve seat body, namely between this valve seat body and a seat receptacle introduced into housing 2 (for example, a recess), whereby the pressure chamber is permanently connected to first channel section 5 by a certain minimum cross section (the second opening cross section). It is then ensured that hydraulic medium is always suppliable between the second and third positions via this leakage gap without hydraulic medium flowing back into second channel section 6.

In other words, a chain tensioner (traction mechanism tensioner 1) is implemented, which includes a pressure reducer/pressure regulator 4, which is connected upstream to reduce the friction in the chain drive. The design of pressure reducer 4 is thus simplified and efficient. Ultimately only one fit is needed, since pressure regulator 4 acting as the valve is combined into one part together with regulating piston 7. A valve 4 is thus integrated into regulating piston 7, only one fit (between receiving chamber 8 and regulating piston 7) having to be introduced into housing 2. The supply pressure is applied to the piston (regulating piston 7) of pressure reducer 4 on the one side, while the ambient pressure is present on the other side. If the pressure at piston 7 is below a maximum supply pressure, tensioner 1 is connected to the oil supply via the bores in the form of radial holes 10. Upon reaching the maximum pressure, piston 7 is displaced, so that the bores in piston 7 are closed. If the check valve in tensioner 1 is provided with a leakage, this oil volume may be stored in the remaining storage space.

LIST OF REFERENCE NUMERALS

1 traction mechanism tensioner
2 housing
3 fluid supply channel
4 valve/pressure control valve
5 first channel section
6 second channel section
7 actuating element/regulating piston
8 receiving chamber
9 inner chamber
10 radial hole
11 annular channel
12 outside
13 pressure spring
14 cover section
15 through-hole
16 outer circumferential side
17 longitudinal axis
18 outer wall
19 end wall
20 inside

What is claimed is:

1. A hydraulic traction mechanism tensioner for a traction mechanism drive of a motor vehicle, the traction mechanism tensioner comprising:
a housing;
a tensioning piston displaceably supported within the housing in an axial direction and enclosing a hydraulic pressure chamber together with the housing; and
a valve inserted into a fluid supply channel of the housing and including an actuating element, the valve hydraulically connecting a first channel section of the fluid supply channel opening into the hydraulic pressure chamber to a hydraulic supply in a first position of the actuating element and disconnecting the first channel section from the hydraulic supply in a second position of the actuating element, the valve being designed as a pressure control valve, the actuating element being movable beyond the second position into another, third position, so that a volume of the first channel section is increased in comparison to the second position, the first channel section being permanently disconnected from the hydraulic supply in a displacement range of the actuating element between the second position and the third position.

2. The traction mechanism tensioner as recited in claim 1 wherein the actuating element is designed in a piston-like manner and is displaceably accommodated axially within a receiving chamber introduced into the housing.

3. The traction mechanism tensioner as recited in claim 1 wherein the actuating element has a radial outer wall provided with at least one radial hole in such a way that, in the first position, a radial inner chamber of the actuating element, hydraulically connected to the first channel section, is hydraulically connected to the hydraulic supply with the aid of the at least one radial hole.

4. The traction mechanism tensioner as recited in claim 1 wherein the actuating element is spring-elastically pretensioned relative to a cover section fixedly mounted on the housing.

5. The traction mechanism tensioner as recited in claim 1 wherein the actuating element is elastically pretensioned in such a way that the actuating element is adjusted as a function of a hydraulic pressure active in the first channel section.

6. The traction mechanism tensioner as recited in claim 1 wherein the actuating element hydraulically connects the first channel section to a second channel section, connected to a hydraulic supply, in the first position and hydraulically disconnects the second channel section from the first channel section in the second position.

7. The traction mechanism tensioner as recited in claim 1 wherein the actuating element is adjusted in the first position at a first hydraulic pressure active in the first channel section, and is adjusted in the second position at a second hydraulic pressure active in the first channel section, the second hydraulic pressure being higher than the first hydraulic pressure.

8. The traction mechanism tensioner as recited in claim 1 further comprising a check valve in the first channel section between the hydraulic pressure chamber and the pressure control valve.

9. The traction mechanism tensioner as recited in claim 1 wherein the valve hydraulically connects the first channel section of the fluid supply channel opening into the hydraulic pressure chamber to the hydraulic supply in the first position of the actuating element by allowing fluid to flow radially through the actuating element from the first channel section of the fluid supply channel opening into the hydraulic pressure chamber.

10. The traction mechanism tensioner as recited in claim 9 wherein the valve hydraulically disconnects the first channel section from the hydraulic supply in the second position of the actuating element by preventing fluid from flowing radially through the actuating element from the first channel section of the fluid supply channel opening into the hydraulic pressure chamber.

11. The traction mechanism tensioner as recited in claim 9 wherein fluid is prevented from flowing radially through the actuating element from the first channel section of the fluid supply channel opening into the hydraulic pressure chamber in the third position.

* * * * *